May 27, 1930.  G. JOHNSON  1,760,833
SEPARABLE FASTENER
Filed July 23, 1926   2 Sheets-Sheet 1
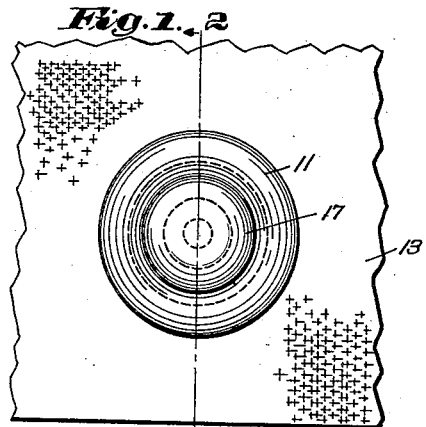
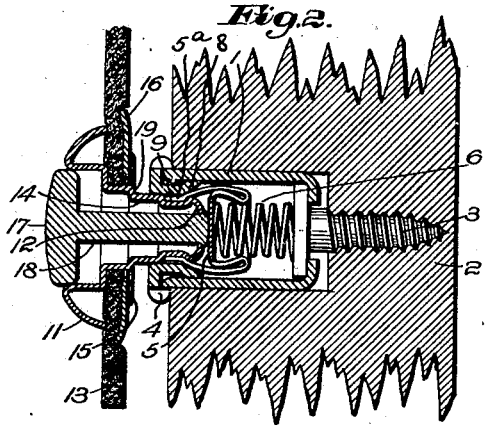
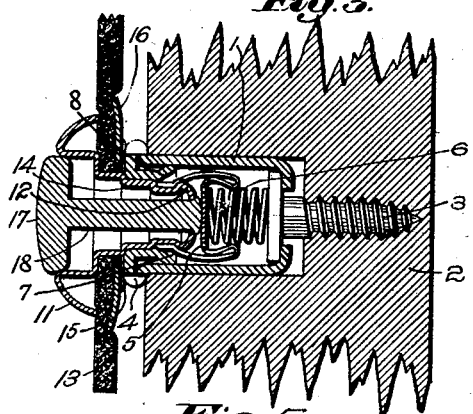
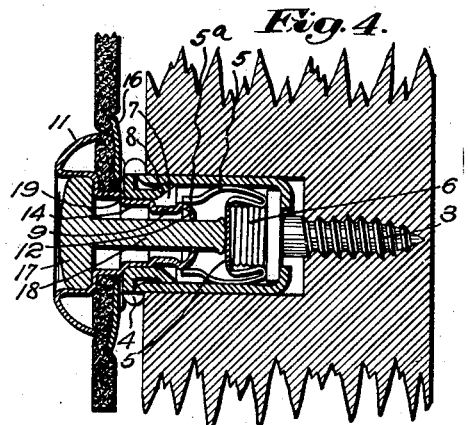
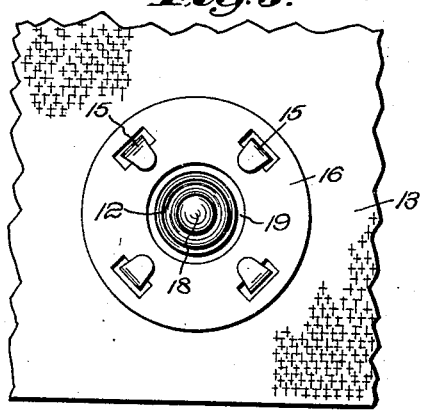
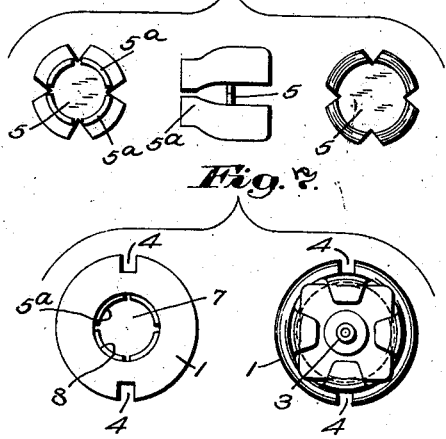
Inventor:
Gustav Johnson
by Emery Booth Janney & Varney
Attys.

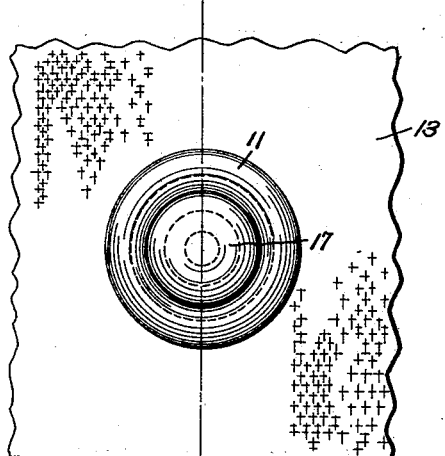
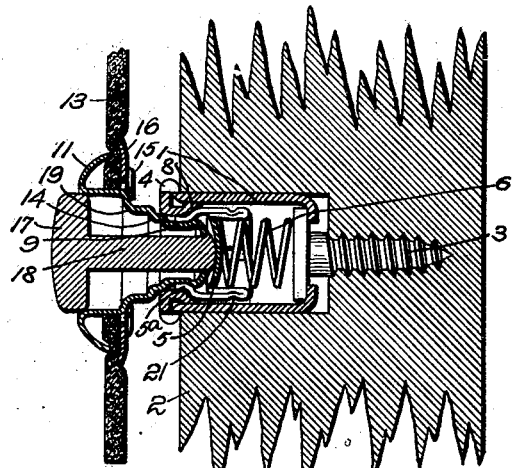
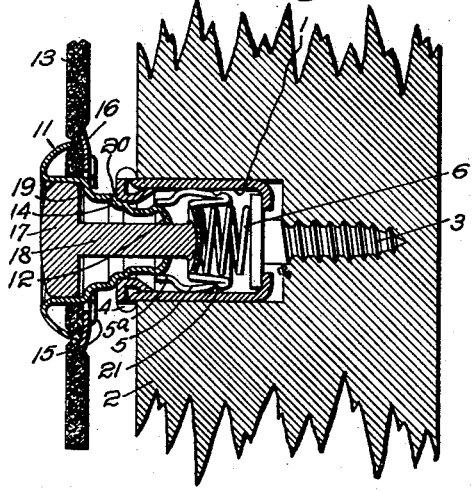
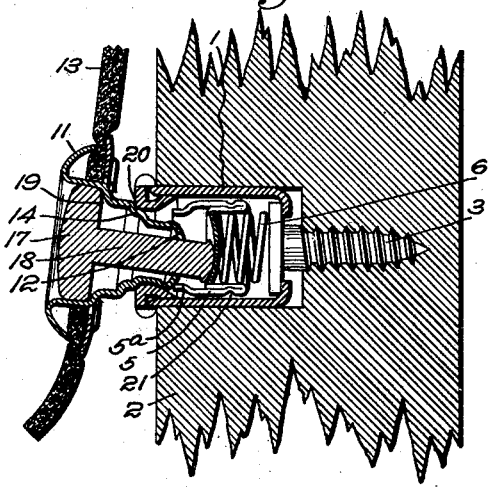
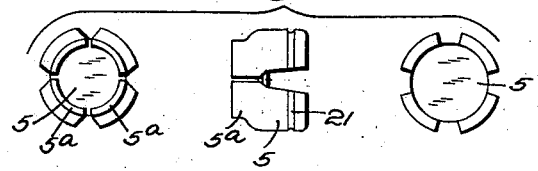

Patented May 27, 1930

1,760,833

UNITED STATES PATENT OFFICE

GUSTAV JOHNSON, OF WEST ROXBURY, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

SEPARABLE FASTENER

Application filed July 23, 1926. Serial No. 124,430.

This invention aims to provide improvements in separable fasteners.

In the drawings, which illustrate two preferred embodiments of my invention:—

Figure 1 is a front elevation of the assembled fastener;

Fig. 2 is a section on the line 2—2 of Fig. 1, showing the normal locked position of the fastener;

Fig. 3 is a section similar to Fig. 2, but showing the first stage in the separating operation of the fastener;

Fig. 4 is a section similar to Fig. 3, but showing the relation of parts just prior to separating the stud from the socket;

Fig. 5 is a rear elevation of the stud attached to a curtain;

Fig. 6 includes elevation views of the clutch member;

Fig. 7 includes a front and rear elevation of the socket;

Fig. 8 is a front elevation of the second form of stud and socket secured together;

Fig. 9 is a section on the line 9—9 of Fig. 8, showing the stud and socket in locked relation;

Fig. 10 is a section similar to Fig. 9, but showing the clutch member being released from the stud during the fastener separating operation;

Fig. 11 is a section of the parts shown in Fig. 10, but showing the manner of tipping the stud out of engagement with the socket; and Fig. 12 includes a front, a side and a rear elevation of the clutch member.

Referring to the embodiment of my invention illustrated in the drawings in Figs. 1 through 7, I have shown a separable fastener of the four-side lock type which is particularly, though not exclusively, useful in connection with securing curtains of vehicles to the body.

The socket member includes a casing 1 which may be of any suitable shape and may be secured to the body 2 in any suitable manner. The attachment illustrated shows the casing countersunk into the body 2 and held in engagement with the body by a screw 3 secured to the casing 1 in the manner shown in Fig. 7, so that there can be no relative rotation between the casing and screw. Slots 4 are provided in the flange of the casing so that a spanner or other suitable tool may be used in rotating the casing to secure the socket to the body 2. Within the casing 1 is assembled a clutch member 5 normally pressed by a spring 6 toward the stud-receiving aperture 7 to engage the wall 8 surrounding the aperture as shown in Fig. 2. This clutch member 5 may be pressed from a single piece of metal and has a base from which extend, in first one direction and then the other, a plurality of relatively long resilient fingers. The terminal ends of the fingers provide jaw means $5^a$ for engagement with the neck 9 of the stud, as more fully hereinafter described. The clutch member fits loosely within the casing so that the fingers may be free to expand without interference from the wall of the casing.

The stud member includes a hollow casing 10 providing a front plate 11, a head 12 and the neck 9. This casing may be secured to the curtain 13 in any suitable manner. However, I have shown it secured to the curtain in such a manner that the front plate lies at the front face of the curtain 13 and the head 12, neck 9 and shank 14 pass through the curtain so that the head 12 and neck 9 are located at the inner face of the curtain. Prongs 15 pass from the front plate 11 through the curtain and then through slots in a back plate 16, after which they are clenched against the back plate to hold the casing assembled with the curtain.

Within the casing 10 is provided an axially movable member providing a press button portion 17 guided in and exposed at the front plate 11, as indicated in Figs. 1 and 2. Integral with the press button portion is a shank portion or displacing member 18 which passes from the button through an aperture in the outer end of the stud member. The free end of the displacing member 18 is headed over to hold the axially movable member in assembly with the casing 10.

In securing the fastener together, the head 12 of the stud member is entered in the aperture 7 of the socket member and pressed against the jaw portions 5ª of the clutch element 5, thereby moving it inwardly against the pressure of the spring 6. During this operation the stud member is pressed toward the socket member until the shoulder 19 on the shank of the stud member seats against the front face of the socket member. The neck of the stud member is thereby entered in the socket member past the straight portion of the wall 8, so that the jaw portions 5ª may expand and pass over the head 12 to engage with the neck 9 of the stud member. Upon release of pressure on the stud member, the spring 6 in the socket member will force the clutch element and stud member outwardly of the socket member until the fingers abut against the tapered portion of the wall, as shown in Fig. 2. In this position the stud member is locked securely in the socket member by the jaws 5ª which are locked with the neck of the stud member. That portion of the wall 8 adjacent the neck 9 and jaws 5ª, being parallel with and fitting closely to the stud member, the jaws 5ª cannot expand to any appreciable extent. It should also be noted that the clutch member 5 bears against the end of the unlocking part 18 and holds the press button pressed outwardly as shown in Fig. 2, thereby eliminating a spring in the stud member.

Separation can be effected only by pressing the stud member inwardly, relative to the socket, from a position shown in Fig. 2 to a position shown in Fig. 3. Then by pressing upon the push button the clutch member 5 may be moved axially of the socket member to displace the jaws 5ª from the neck 9 of the stud member, as shown in Fig. 4. While the press button is held pressed inwardly, the stud member may be withdrawn from the socket by exerting an outward pull on the curtain 13. Separation of the fastener is also assisted by the camming action of the jaw portions 5ª on the sloping head of the stud.

It should be noted that the fastener cannot be separated by merely pressing upon the button without first moving the stud member bodily relative to the socket member, and therefore the space between the face of the socket member and the shoulder 19 should be at least the distance that is required to move the stud member so that the neck of the stud will be beyond the parallel portion of the wall. This movement is a necessary part of the operation because the jaws 5ª cannot expand until they are out of the plane of the parallel portion of the wall.

Referring now to the form of my invention illustrated in Figs. 8 through 12, I have shown a fastener which is substantially the same as shown and described in connection with Figs. 1 through 8 except that it is so formed that it may be separated, after certain manipulation, by tipping the stud member relative to the socket member. In the first form the stud member must move axially relative to the socket member after the clutch has been disengaged from the stud member while in the second form the stud member may be tipped relative to the socket member immediately after the clutch has been disengaged.

In order to permit tipping the stud member out of engagement with the socket member, the dimensions of the wall 8 of the socket member are changed so that a slight push of the stud toward the socket member moves the neck 9 and jaw portions 5ª of the clutch out of locking engagement with the wall 8. This slight movement brings an annular shoulder 20 formed on the shank of the stud against the face of the socket member, as shown in Fig. 10, and then a continued push on the button 17 forces the clutch 5 inwardly and the jaws 5ª out of engagement with the neck 9 of the stud member. If now the lower edge of the curtain 13 be pulled outwardly, the stud will immediately tip about a point of contact between the shoulders 20 and edge of the wall 8 at the aperture 7 as shown in Fig. 11. As the pull on the lower edge of the curtain continues, the head 12 rides up the inclined surface of the wall 8 and the shouldered portion 20 rides about the contact with the wall 8. The natural tendency in separating a fastener of the type shown is to grasp the curtain from below the stud member and, with the fingers in back of the curtain and the thumb on the press button, tip the stud out of engagement with the socket member. In the form shown in Figs. 8 through 12, this action may take place very easily and smoothly, while in the form shown in Figs. 1 through 7 the action is more stiff because, while the tendency would be to tip the stud it would bind to some extent until after the relatively closely fitting shank portion were free from the wall 8.

In the fastener shown in Figs. 8 through 12, the clutch member 5 is provided with a groove 21 rolled or otherwise formed in the fingers. This groove merely provides greater resiliency to the jaw portions 5ª and may or may not be provided as desired.

While I have shown and described a preferred embodiment of my invention, it should be understood that changes involving omission, substitution, alteration and reversal of parts and even changes in the mode of operation may be made without departing from the scope of my invention, which is best defined in the following claims.

Claims:

1. A separable fastener comprising, in combination, a stud member secured to a support and having a neck, a socket member provided with a front face having a stud-receiving aperture therethrough surrounded by a wall of substantial width, an axially shiftable spring-pressed clutch element located in said socket member and having yieldable jaws for engagement with the neck of the stud member, said jaws adapted to cooperate with the neck of the stud member and the wall surrounding the stud-receiving aperture to lock said stud member and socket member against accidental separation when said neck is opposite the wall surrounding said aperture and extended shank means forming part of the stud assembly and spacing the stud member support from the front face of the socket member to permit for axial movement of one of said fastener members toward the other member thereby to move the neck of the stud member away from the wall surrounding the stud-receiving aperture to permit separation of the jaws of the clutch element from the neck of the stud member.

2. A separable fastener comprising, in combination, a stud member secured to a support and having a neck, a socket member provided with a front face having a stud-receiving aperture therethrough surrounded by a wall of substantial width, an axially shiftable spring-pressed clutch element located in said socket member and having yieldable jaws for engagement with the neck of the stud member, said jaws adapted to cooperate with the neck of the stud member and the wall surrounding the stud-receiving aperture to lock said stud member and socket member against accidental separation when said neck is opposite the wall surrounding said aperture, extended shank means forming part of the stud assembly and spacing the stud member support from the front face of the socket member to provide for axial movement of one of said fastener members toward the other member thereby to move the neck of the stud member away from the wall surrounding the stud-receiving aperture to permit separation of the jaws of the clutch element from the neck of the stud member and button means provided as a part of the fastener for disengaging the clutch element from the neck of the stud member after the initial axial movement of the fastened members.

3. A separable fastener comprising, in combination, a stud member having a neck, a socket member having a stud-receiving aperture surrounded by a wall of substantial width, said wall having at least a portion thereof parallel with the axis of said socket member, a spring-pressed clutch element located in the socket member and presenting a plurality of expansible and contractible jaws having straight portions for engagement between said neck and said parallel portion of said wall to lock said stud member and socket member against accidental separation, means forming part of the stud member for permitting limited movement of the stud member so that said neck may be presented inwardly of said parallel portion of said wall and axially movable means forming part of the fastener assembly for disengaging said jaw means from said neck when held inwardly of said parallel portion of said wall thereby to permit separation of the fastener.

4. A separable fastener comprising, in combination, a stud member having a neck, a socket member having a stud-receiving aperture surrounded by a straight wall of substantial width, and axially shiftable clutch element in said socket member having yieldable jaws for engagement with the neck of the stud member and a spring in said socket member normally urging said clutch toward said wall, said spring adapted, when said stud member is entered into said socket member, to force said jaws into engagement with said neck and thereafter to move said stud member and clutch axially relative to said socket member to bring said neck opposite said wall to prevent expansion of said clutch thereby locking the fastener against accidental separation.

5. A separable fastener comprising, in combination, a stud member having a socket engaging portion provided with a head and a neck, an axially movable unlocking member assembled within said stud member, a cooperating socket member having a stud-receiving aperture surrounded by a straight wall portion of substantial length and being parallel with the axis of said socket member, and yieldable neck-engaging locking means provided as a part of the socket member and having straight portions engaged with said neck and said wall to lock the stud member and socket member against separation when the stud member and socket member are engaged.

6. A separable fastener comprising, in combination, a stud member secured to a flexible carrying medium and presenting at one side of the carrying medium a non-resilient head and neck and at the other side an axially movable press button having a shank portion passing through the stud member and having one end exposed at the head of the stud member, a cooperating socket member having a casing secured to a rigid support, said casing presenting an aperture surrounded by a wall of substantial width, an axially movable spring-pressed clutch element located within said casing and presenting expansible and contractible jaw portions at the ends of the resilient fingers, said jaw portions adapted to engage said neck and to be locked in engagement therewith by said wall to lock said stud member and socket member together and a lost motion connection between the stud member and the socket member whereby the fastener is adapted to be separated only by initial axial movement of said stud member relative to said socket member, subsequent axial movement of said press button relative to said stud member to disengage the clutch element from the neck of the said stud member and final outward movement of the stud member relative to the socket member.

7. A separable fastener comprising, in combination, a stud member secured to a flexible carrying medium and presenting at one side of the carrying medium a non-resilient head and neck, and at the other side a press button having a shank portion passing through the stud member and exposed at the head of the stud member, a cooperating socket member having a casing secured to a rigid support, said casing presenting an aperture surrounded by a wall of substantial width, a spring-pressed clutch element within said casing presenting expansible and contractible jaw portions at the ends of resilient fingers, said jaw portions adapted to engage said neck and to be locked in engagement therewith by said wall to lock said stud member and socket member together and said fastener separable only by initial axial movement of said stud member relative to said socket member, subsequent axial movement of said press button relative to said stud member and final outward pull upon the stud member, the face of said socket member and the inner face of the stud assembly being spaced apart at least the distance of the width of the wall surrounding said aperture thereby to permit said initial axial movement between the stud member and socket member.

8. A separable fastener comprising, in combination, a socket member presenting a stud-receiving aperture surrounded by a wall providing a part of the locking means of the fastener, a clutch member located within said socket member and having resilient stud-engaging jaw portions, a cooperating stud member having a head and a neck, said stud member being provided with an elongated shank adjacent to said neck, said shank being of a size to enter into said stud-receiving aperture so that the neck of the stud member passes beyond the locking porton of said wall to permit said clutch to engage said neck and spring means forming part of the socket member for moving said clutch and stud member bodily into locking relation to said wall.

9. A separable fastener comprising, in combination, a stud member having a head and a neck, a cooperating socket member, a spring-pressed axially shiftable element assembled in said socket member for locking said stud member and socket member against accidental separation by an outward stress exerted thereon, axially movable means carried by said stud member and means cooperating between the stud member and socket member to provide a lost motion connection whereby when said stud member has been initially moved inwardly of the normal locked position relative to the socket member, said locking element may be shifted out of engagement with said stud member which is then free to be disengaged from the socket.

10. A socket member having a casing, means carried by said casing for securing it to a support, a stud-receiving aperture located in one end of said casing and surrounded by a tubular wall portion of substantial length, said wall portion being parallel to the axis of the socket member and an axially movable spring-pressed clutch member having yieldable means formed integral therewith for cooperation with said wall to lock a stud member in engagement with said socket member.

11. A socket member having a casing, means carried by said casing for securing it to a support, a stud-receiving aperture located in one end of said casing and surrounded by a tubular wall portion of substantial length, said wall portion being parallel to the axis of the socket member and a spring-pressed axially movable clutch member having a plurality of straight jaw portions formed integral therewith for cooperation with said wall to lock a stud member in engagement with said socket member.

12. A separable fastener comprising, in combination, a rigid stud member having a head, a neck, and a shank, a cooperating socket member including a casing presenting a stud-receiving aperture, a spring-pressed resilient clutch member located within the socket casing for engagement with said neck to lock said stud member with said socket member, an axially movable clutch-displacing element carried by said stud member and held immovable by said clutch when said stud member and socket member are locked, and an annular shoulder on the shank of said stud member normally spaced from the face of the casing when the stud member and socket member are locked together, said shank providing lost motion means whereby said shoulder is adapted to be pressed against the face of said socket member during the separating action of said fastener to provide a pivot about which said stud member may be tipped after said clutch has been disengaged from said stud member by said clutch-displacing element.

13. A fastener socket member including a casing having a stud-receiving aperture in one end thereof, an attaching element extending from the other end thereof, an axially movable resilient clutch element located within the casing for engagement with the neck of a stud member and a spring normally pressing said clutch element toward the stud-receiving aperture, said clutch element having a base portion and a plurality of expansible and contractible fingers extending from said base toward said attaching part and then being reversely bent and having their free ends extending beyond said base and toward the stud-receiving aperture.

In testimony whereof, I have signed my name to this specification.

GUSTAV JOHNSON.